United States Patent [19]

Yamamoto

[11] Patent Number: 5,407,472

[45] Date of Patent: Apr. 18, 1995

[54] SOLID DRAWING COMPOSITION

[75] Inventor: Ryuzo Yamamoto, Sakai, Japan

[73] Assignee: Sakura Color Products Corporation, Osaka, Japan

[21] Appl. No.: 280,676

[22] Filed: Jul. 27, 1994

[30] Foreign Application Priority Data

Jul. 28, 1993 [JP] Japan .................................. 5-186247

[51] Int. Cl.$^6$ .............................................. C09D 13/00
[52] U.S. Cl. ................. 106/19 B; 106/19 D; 106/19 E
[58] Field of Search .................. 106/19 B, 19 D, 19 E

[56] References Cited

U.S. PATENT DOCUMENTS 2,380,126  7/1943  Strum .................................. 106/19 B

FOREIGN PATENT DOCUMENTS 29521  3/1980  Japan .................................. 106/19 B
33970  2/1992  Japan .................................. 106/19 B

*Primary Examiner*—Helene Klemanski
*Attorney, Agent, or Firm*—Larson and Taylor

[57] ABSTRACT

The present invention provides a solid drawing composition comprising barium sulfate, the composition further comprising, as a barium dissolving inhibitor, at least one of (a) alkali metal sulfate, (b) beryllium sulfate, magnesium sulfate, calcium sulfate or strontium sulfate, (c) aluminum sulfate, (d) zinc sulfate, and (e) a double salt of said sulfates (a) to (d).

12 Claims, No Drawings

SOLID DRAWING COMPOSITION

FIELD OF THE INVENTION

The present invention relates to a solid drawing composition.

BACKGROUND OF THE INVENTION

Solid drawing compositions such as crayons, oil pastels, plastic crayons, colored pencils and the like generally comprise a wax, an extender pigment, a coloring pigment, a concentration adjuster, etc. Among these components, the extender pigment, concentration adjuster and the like may contain a predetermined amount of barium sulfate which enables the components to exhibit their functions effectively.

However, in recent years, standards for safety of toys have been altered in Europe and the U.S. to tighten control. Consequently pigments and like materials containing specific soluble heavy metals have been legally regulated. Since such heavy metals include barium, the use of barium lake and like pigments is restricted. The control is strict especially in Europe. For example, under European Standards EN 71, the detected value of barium as measured by the prescribed method shall not exceed 500 ppm.

At present, barium sulfate is not controlled under said regulation. However, the barium sulfate used as an extender pigment or as a concentration adjuster for a coloring pigment is slightly dissolved out so that a detected value of barium may exceed the prescribed level of 500 ppm, thereby posing a safety problem.

On the other hand, currently, no material is superior to barium sulfate as an additive for an extender pigment, concentration adjuster and the like, and it is difficult to find out a substitute for barium sulfate.

SUMMARY OF THE INVENTION

An object of the present invention is to provide a solid drawing composition which contains barium sulfate and in which the barium is substantially not dissolved out.

The present invention provides a solid drawing composition containing barium sulfate, the composition comprising, as a substance capable of inhibiting barium from dissolving out, at least one of (a) alkali metal sulfate, (b) beryllium sulfate, magnesium sulfate, calcium sulfate or strontium sulfate, (c) aluminum sulfate, (d) zinc sulfate, and (e) a double salt of said sulfates (a) to (d).

DETAILED DESCRIPTION OF THE INVENTION

The inventors found that when a specific sulfate is incorporated in a drawing composition containing barium sulfate, the barium can be significantly inhibited or prevented from dissolving out. The present invention has been accomplished based on this finding.

The present invention is described below in detail.

The solid drawing composition of the present invention is prepared by incorporating a predetermined amount of a specific sulfate and/or a double salt thereof into a conventional solid drawing composition such as a crayon, an oil pastel, a plastic crayon, a color pencil, etc. which contains barium sulfate as an ingredient of an extender pigment or the like.

According to the invention, at least one of (a) alkali metal sulfate, (b) beryllium sulfate, magnesium sulfate, calcium sulfate or strontium sulfate, (c) aluminum sulfate, (d) zinc sulfate, and (e) a double salt of said sulfates (a) to (d) can be used as a substance capable of inhibiting barium from dissolving out (hereinafter referred to as "barium dissolving inhibitor"). Among them, preferable are sodium sulfate, potassium sulfate, calcium sulfate, magnesium sulfate, strontium sulfate, aluminum sulfate, zinc sulfate and a double salt of these sulfates (such as calcium sodium sulfate, magnesium potassium sulfate, calcium potassium sulfate, zinc potassium sulfate and the like). More preferable are calcium sulfate and the like.

The amount of the barium dissolving inhibitor used is about 0.001 to about 20% by weight, preferably about 0.2 to about 1% by weight, based on the solid drawing composition. When the amount of the inhibitor exceeds 20% by weight, the resulting composition has poor drawability and thus is not suitable for use. If the amount is less than 0.001% by weight, the effect of inhibiting barium from dissolving out is unsatisfactory. Thus it is undesirable to use the inhibitor outside the said quantity range. However, insofar as the drawability is not impaired, the amount of the barium dissolving inhibitor, of course, may exceed 20% by weight.

The present invention also provides a solid drawing composition comprising a wax, an extender pigment, a coloring pigment and barium sulfate, the composition being characterized by containing a substance capable of inhibiting barium from dissolving out, the substance being at least one of (a) alkali metal sulfate, (b) beryllium sulfate, magnesium sulfate, calcium sulfate or strontium sulfate, (c) aluminum sulfate, (d) zinc sulfate and (e) a double salt of said sulfates (a) to (d) (hereinafter called "second invention").

Described below are the components other than barium dissolving inhibitor to be used in the solid drawing composition of the second invention.

Extender pigments which can be used in the second invention include those heretofore known such as barium sulfate, calcium carbonate, magnesium carbonate, talc, clay, silica, kaolin and the like. The term "barium sulfate" used herein encompasses all of the barium sulfates such as precipitated barium sulfate, elutriated barium sulfate, etc. The amount of the extender pigment used is up to 70% by weight. If the amount of the extender pigment is more than 70% by weight, it is difficult to effect molding due to the increased viscosity of composition in a molten state, or poor drawability results. The lower limit of the extender pigment quantity is selected according to the formulation, desired properties and other factors of the solid drawing composition and is usually about 3% by weight.

Coloring pigments which can be used in the second invention include those containing barium sulfate used as a concentration adjuster. Known pigments can be used and include, for example, Fast Red 1547D, Z6 Violet J, Prussian Blue 660A (products of Dainichi Seika Color & Chemicals Manufacturing, Co., Ltd.), Ultramarine Blue C, Ultramarine Blue #8000, Ultramarine Blue PB-30 (products of Daiichi Kasei Kogyo), Red 7010, Symular Fast Yellow GF Conc. (products of Dai Nippon Ink & Chemicals Inc.) and the like. Also usable are conventional coloring pigments free from barium sulfate used as a concentration adjuster. Examples of such pigments are Cyanine Blue, Cyanine Green, Hansa Yellow, Quinacridone Red, Naphthol Red, Watchung Red, Dioxazine Violet, Carbon Black, titanium dioxide, Prussian Blue, Perinone Orange, Ultramarine Blue, fluorescent pigments, etc. The amount of these coloring pigments used is about 0.5 to about 40% by weight based on the drawing composition. If the amount of the coloring pigment is more than 40% by weight, a sharp color can not be produced, or it is difficult to effect molding due to the increased viscosity of composition in a molten state, or poor drawability results. If the amount is less than 0.5% by weight, a satisfactory color can not be provided.

In the solid drawing composition of the second invention, at least one of the extender pigment and coloring pigment contains barium sulfate. Barium sulfate may be contained as another component in the solid drawing composition of the second invention.

Waxes conventionally used for known drawing compositions can be used as such in the second invention. Examples of useful waxes are ketone wax, animal base hardened oil, vegetable base hydrogenated oil, paraffin wax, microcrystalline wax, polyethylene wax, liquid paraffin, aliphatic amide, poly α-olefin, beeswax, carnauba wax, Japan wax, etc. The amount of the wax used is about 20 to about 95% by weight. If the amount of the wax is less than 20% by weight, it is difficult to effect molding due to the increased viscosity of composition in a molten state, or poor drawability results. If the amount is more than 95% by weight, the obtained drawing composition has reduced strength and the wax is likely to adhere to the hand, etc.

The present invention further provides a solid drawing composition comprising a wax, an extender pigment, a coloring pigment, an olefin polymer and barium sulfate, the composition being characterized by containing a substance capable of inhibiting barium from dissolving out, the substance being at least one of (a) alkali metal sulfate, (b) beryllium sulfate, magnesium sulfate, calcium sulfate or strontium sulfate, (c) aluminum sulfate, (d) zinc sulfate, and (e) a double salt of said sulfates (a) to (d) (hereinafter called "third invention").

Described below are the components other than barium dissolving inhibitor to be used in the solid drawing composition of the third invention.

The extender pigments exemplified above for the second invention can be used in the third invention. Further, calcium stearate, zinc stearate and the like are also usable. The amount of the extender pigment used is up to about 50% by weight. If the amount of the extender pigment is more than 50% by weight, it is difficult to effect molding due to the increased viscosity of composition in a molten state, or poor drawability results. The lower limit of the extender pigment quantity is selectable according to the formulation, desired properties and other factors of the solid drawing composition and is usually about 1% by weight.

The coloring pigments containing or not containing barium sulfate used in a concentration adjuster can be used in the third invention as well as in the second invention. The amount of the coloring pigment used may be the same as in the second invention.

In the solid drawing composition of the third invention, at least one of the extender pigment and coloring pigment contains barium sulfate. Barium sulfate may be contained as another component in the solid drawing composition of the third invention.

The wax to be used in the third invention may be those exemplified above for the second invention. The amount of the wax used is about 5 to about 70% by weight. If the amount of the wax is less than 5% by weight, it is difficult to effect molding due to the increased viscosity of composition in a molten state, or poor drawability results. If the amount is more than 70% by weight, the resulting drawing composition has reduced strength and the wax is likely to adhere to the hand, etc.

The olefin polymer to be used is not specifically limited, and can be, for example, polyethylene, polypropylene, ethylene-vinyl acetate copolymer, ethylene-ethylacrylate copolymer and the like. The amount of the olefin polymer used is about 5 to about 60% by weight. If the amount of the olefin polymer is less than 5% by weight, the resulting drawing composition has reduced strength or is likely to adhere to the hand, etc. If the amount is more than 60% by weight, a decreased coloration effect is produced.

Also usable are butyl stearate, polyethylene glycol and like additives used in conventional drawing compositions. The amount of such additive used is about 0.5 to about 30% by weight. If less than 0.5% by weight of the additive is used, poor drawability results, whereas if more than 50% by weight thereof is used, the obtained drawing composition has reduced strength.

The solid drawing composition of the present invention can be prepared by processes for preparing conventional solid drawing compositions, for example, by a process comprising adding a pigment, a barium dissolving inhibitor and other components to a molten wax, stirring the mixture, dispersing the mixture with a dispersing device such as single-roll mill, three-roll mill, Henschel mixer, kneader and the like and placing the composition into a molding die.

The solid drawing composition of the present invention can reduce the amount of soluble barium without impairing its drawability, strength and other properties, and can produce remarkable effects in respect of safety and so on.

EXAMPLES

Examples, Comparative Examples and Test Example are given below to illustrate the present invention in greater detail.

In Test Example, the amount of dissolved-out barium was measured according to the method defined in European Standards EN 71, part 3. A drawability test was conducted by holding a molded product of the solid drawing composition in hand and drawing a line on drawing paper. The results were evaluated according to the following criteria.

A: Drawn with resistance.
B: Drawn smoothly without resistance.

EXAMPLE 1

Sample No. 1 of a solid drawing composition (oil pastel) with the formulation shown in Table 1 was prepared. Sample No. 1' was also prepared for comparison using calcium carbonate in lieu of calcium sulfate.

TABLE 1

| Component | Amount (wt. part) |
| --- | --- |
| Fast Red 1547D | 5 |
| (containing about 20% of barium sulfate) | |
| Permanent Red FGR | 10 |
| (product of Hoechst AG, Naphthol Red) | |
| Calcium sulfate | 13 |
| Calcium carbonate | 39 |
| Highly hydrogenated beef tallow | 15 |
| Paraffin 135° F. | 3 |

TABLE 1-continued

| Component | Amount (wt. part) |
|---|---|
| Liquid paraffin | 15 |

EXAMPLE 2

Sample No. 2 of a solid drawing composition (crayon) with the formulation shown in Table 2 was prepared. Sample No. 2' was also prepared for comparison using calcium carbonate in lieu of potassium sulfate.

TABLE 2

| Component | Amount (wt. part) |
|---|---|
| Dioxazine violet | 4 |
| Titanium dioxide | 12 |
| Potassium sulfate | 0.5 |
| Barium sulfate | 3 |
| Calcium carbonate | 25 |
| Talc | 18 |
| Extreamly hydrogenated beef tallow | 18.5 |
| Dialen 30 | 4 |
| (product of Mitsubishi Chemical Industries, Ltd., poly α-olefin) | |
| Liquid paraffin | 15 |

EXAMPLE 3

Sample No. 3 of a solid drawing composition (oil pastel) with the formulation shown in Table 3 was prepared. Sample No. 3' was also prepared for comparison using calcium carbonate in lieu of magnesium sulfate.

TABLE 3

| Component | Amount (wt. part) |
|---|---|
| Ultramarine Blue PB-30 | 20 |
| (containing a few percents of barium sulfate) | |
| Magnesium carbonate | 6 |
| Calcium carbonate | 23 |
| Aluminum sulfate | 1 |
| Microcrystalline wax | 5 |
| Carnauba wax | 18 |
| Petrolatum | 7 |
| Liquid paraffin | 20 |

EXAMPLE 4

Sample No. 4 of a solid drawing composition (oil pastel) with the formulation shown in Table 4 was prepared. Sample No. 4' was also prepared for comparison using calcium carbonate in lieu of aluminum sulfate and calcium sulfate.

TABLE 4

| Component | Amount (wt. part) |
|---|---|
| Z6 violet J | 10 |
| (containing about 30% of barium sulfate) | |
| Hostaperm Red E3B | 7 |
| (product of Hoechst AG, Quinacridone Red) | |
| Magnesium carbonate | 20 |
| Aluminum sulfate | 13 |
| Calcium sulfate | 6 |
| Neowax L | 12 |
| (Product of Yasuhara Chemical, polyethylene wax) | |
| Japan wax | 10 |
| Liquid paraffin | 22 |

COMPARATIVE EXAMPLE 1

Comparative Sample No. 1 of a solid drawing composition (oil pastel) with the formulation shown in Table 5 was prepared.

TABLE 5

| Component | Amount (wt. part) |
|---|---|
| Fast Red 1547D | 5 |
| (containing about 20% of barium sulfate) | |
| Permanent Red FGR | 10 |
| (product of Hoechst AG, Naphthol Red) | |
| Calcium sulfate | 30 |
| Calcium carbonate | 22 |
| Extremely hydrogenated beef tallow | 15 |
| Paraffin 135° F. | 3 |
| Liquid paraffin | 15 |

EXAMPLE 5

Sample No. 5 of a solid drawing composition (plastic crayon) with the formulation shown in Table 6 was prepared. Sample No. 5' was also prepared for comparison using calcium carbonate in lieu of calcium sulfate.

TABLE 6

| Component | Amount (wt. part) |
|---|---|
| Hostaperm Red F5RK | 10 |
| (product of Hoechst AG, Naphthol Red) | |
| Barium sulfate | 10 |
| Calcium sulfate | 2 |
| Calcium stearate | 10 |
| Microcrystalline wax | 13 |
| High-pressure process polyethylene | 30 |
| Ethylene-vinyl acetate copolymer | 10 |
| PEG 6000 | 7 |
| Liquid paraffin | 8 |

EXAMPLE 6

Sample No. 6 of a solid drawing composition (plastic crayon) with the formulation shown in Table 7 was prepared. Sample No. 6' was also prepared for comparison using calcium carbonate in lieu of magnesium sulfate and calcium sulfate.

TABLE 7

| Component | Amount (wt. part) |
|---|---|
| Prussian Blue 660A | 9 |
| (containing about 4% of barium sulfate) | |
| Aluminum sulfate | 10 |
| Calcium stearate | 13 |
| High-pressure process polyethylene | 30 |
| Stearic acid amide | 13 |
| Ethylene-vinyl acetate copolymer | 10 |
| PEG 6000 | 7 |
| Liquid paraffin | 8 |

EXAMPLE 7

Sample No. 7 of a solid drawing composition (plastic crayon) with the formulation shown in Table 8 was prepared. Sample No. 7' was also prepared for comparison using calcium carbonate in lieu of calcium sulfate and aluminum sulfate.

TABLE 8

| Component | Amount (wt. part) |
|---|---|
| Ultramarine Blue PB-30 | 10 |
| (containing a few percents of barium sulfate) | |
| Calcium sulfate | 5 |
| Aluminum sulfate | 10 |
| Calcium stearate | 13 |
| High-pressure process polyethylene | 27 |

TABLE 8-continued

| Component | Amount (wt. part) |
| --- | --- |
| Distearyl ketone | 10 |
| Ethylene-vinyl acetate copolymer | 10 |
| Paraffin 115° F. | 7 |
| Butyl stearate | 8 |

EXAMPLE 8

Sample No. 8 of a solid drawing composition (plastic crayon) with the formulation shown in Table 9 was prepared. Sample No. 8' was also prepared for comparison using calcium carbonate in lieu of calcium sulfate and aluminum sulfate.

TABLE 9

| Component | Amount (wt. part) |
| --- | --- |
| Fast Red 1547D (containing about 20% of barium sulfate) | 10 |
| Potassium sulfate | 18 |
| Zinc stearate | 8 |
| High-pressure process polyethylene | 26 |
| Fischer-Tropsch wax | 13 |
| Ethylene-ethyl acrylate copolymer | 10 |
| PEG 6000 | 7 |
| Liquid paraffin | 8 |

EXAMPLE 9

A sample No. 9 of a solid drawing composition (oil pastel) with the formulation shown in Table 10 was prepared. Sample No. 9' was also prepared for comparison using calcium carbonate in lieu of sodium sulfate.

TABLE 10

| Component | Amount (wt. part) |
| --- | --- |
| Ultramarine Blue #8000 (containing a few percents of barium sulfate) | 12 |
| Cyanine blue | 5 |
| Sodium sulfate | 13 |
| Calcium carbonate | 37 |
| Stearic acid amide | 8 |
| Paraffin 115° | 10 |
| Liquid paraffin | 15 |

EXAMPLE 10

Sample No. 10 of a solid drawing composition (crayon) with the formulation shown in Table 11 was prepared. Sample No. 10' was also prepared for comparison using calcium carbonate in lieu of zinc sulfate.

TABLE 11

| Component | Amount (wt. part) |
| --- | --- |
| Dioxazine violet | 6 |
| Zinc oxide | 8 |
| Zinc sulfate | 0.7 |
| Barium sulfate | 5 |
| Calcium carbonate | 11 |
| Talc | 14 |
| Carnauba wax | 21.3 |
| Paraffin 135° | 19 |
| Liquid paraffin | 15 |

EXAMPLE 11

Sample No. 11 of a solid drawing composition (crayon) with the formulation shown in Table 12 was prepared. Sample No. 11' was also prepared for comparison using calcium carbonate in lieu of strontium sulfate.

TABLE 12

| Component | Amount (wt. part) |
| --- | --- |
| Ultramarine Blue PB-30 (containing a few percents of barium sulfate) | 15 |
| Talc | 12 |
| Calcium carbonate | 14 |
| Strontium sulfate | 5 |
| Microcrystalline wax | 13 |
| Distearyl ketone | 21 |
| Petrolatum | 4 |
| Liquid paraffin | 16 |

EXAMPLE 12

Sample No. 12 of a solid drawing composition (oil pastel) with the formulation shown in Table 13 was prepared. Sample No. 12' was also prepared for comparison using calcium carbonate in lieu of calcium potassium sulfate.

TABLE 13

| Component | Amount (wt. part) |
| --- | --- |
| Ultramarine Blue PB-30 (containing a few percents of barium sulfate) | 18.5 |
| Kaolin | 6 |
| Magnesium carbonate | 20 |
| Calcium potassium sulfate | 1.5 |
| Beeswax | 5 |
| Distearyl ketone | 21 |
| Petrolatum | 4 |
| Liquid paraffin | 24 |

EXAMPLE 13

Sample No. 13 of a solid drawing composition (plastic crayon) with the formulation shown in Table 14 was prepared. Sample No. 13' was also prepared for comparison using calcium carbonate in lieu of sodium sulfate.

TABLE 14

| Component | Amount (wt. part) |
| --- | --- |
| Hostaperm Red F5RK (Hoechst AG, Naphthol Red) | 10 |
| Barium sulfate | 7 |
| Sodium sulfate | 5 |
| Calcium stearate | 10 |
| High-pressure process polyethylene | 22 |
| Stearic acid amide | 13 |
| Ethylene-vinyl acetate copolymer | 10 |
| PEG 6000 | 15 |
| Liquid paraffin | 8 |

EXAMPLE 14

Sample No. 14 of a solid drawing composition (plastic crayon) with the formulation shown in Table 15 was prepared. Sample No. 14' was also prepared for comparison using calcium carbonate in lieu of zinc sulfate.

TABLE 15

| Component | Amount (wt. part) |
| --- | --- |
| Vulcan Orange | 6 |
| Barium sulfate | 7 |
| Zinc sulfate | 1 |
| Calcium stearate | 10 |
| High-pressure process polyethylene | 26 |
| Stearic acid amide | 10 |
| Ethylene-vinyl acetate copolymer | 15 |
| PEG 6000 | 15 |

TABLE 15-continued

| Component | Amount (wt. part) |
|---|---|
| Butyl stearate | 10 |

EXAMPLE 15

Sample No. 15 of a solid drawing composition (plastic crayon) with the formulation shown in Table 16 was prepared. Sample No. 15' was also prepared for comparison using calcium carbonate in lieu of strontium sulfate.

TABLE 16

| Component | Amount (wt. part) |
|---|---|
| Cyanine Green | 4 |
| Barium sulfate | 13 |
| Strontium sulfate | 3 |
| Aluminum stearate | 12 |
| High-pressure process polyethylene | 26 |
| Ethylene-vinyl acetate copolymer | 11 |
| Beeswax | 15 |
| Liquid paraffin | 16 |

EXAMPLE 16

Sample No. 16 of a solid drawing composition (plastic crayon) with the formulation shown in Table 17 was prepared. Sample No. 16' was also prepared for comparison using calcium carbonate in lieu of zinc potassium sulfate.

TABLE 17

| Component | Amount (wt. part) |
|---|---|
| Symular Fast Yellow GF Conc. (containing a few percents of barium sulfate) | 10 |
| Titanium dioxide | 5 |
| Barium sulfate | 9 |
| Zinc potassium sulfate | 4 |
| Zinc stearate | 10 |
| High-pressure process polyethylene | 27 |
| Ethylene-ethyl acrylate copolymer | 8 |
| Japan wax | 12 |
| Liquid paraffin | 15 |

COMPARATIVE EXAMPLE 2

Comparative Sample No. 2 of a solid drawing composition (plastic crayon) with the formulation shown in Table 18 was prepared.

TABLE 18

| Component | Amount (wt. %) |
|---|---|
| Z6 violet J (containing about 30% of barium sulfate) | 7 |
| Magnesium sulfate | 24 |
| Calcium stearate | 10 |
| High-pressure process polyethylene | 30 |
| Ethylene-vinyl acetate copolymer | 10 |
| Paraffin 130° F. | 7 |
| Microcrystalline wax | 4 |
| Butyl stearate | 8 |

TEST EXAMPLE 1

Using the above-obtained Samples Nos. 1 to 16 and Nos. 1' to 16' and Comparative Samples Nos. 1 and 2, the amount of dissolved-out barium was measured and a drawability test was conducted. The results are shown in Table 19.

TABLE 19

| Sample No. | Amount of soluble barium (ppm) | Drawability |
|---|---|---|
| 1 | 10 | A |
| 2 | 23 | A |
| 3 | 7 | A |
| 4 | 18 | A |
| 5 | 4 | A |
| 6 | 8 | A |
| 7 | 13 | A |
| 8 | 10 | A |
| 9 | 10 | A |
| 10 | 12 | A |
| 11 | 7 | A |
| 12 | 15 | A |
| 13 | 9 | A |
| 14 | 20 | A |
| 15 | 13 | A |
| 16 | 18 | A |
| 1' | 510 | A |
| 2' | 490 | A |
| 3' | 536 | A |
| 4' | 570 | A |
| 5' | 508 | A |
| 6' | 516 | A |
| 7' | 521 | A |
| 8' | 494 | A |
| 9' | 480 | A |
| 10' | 523 | A |
| 11' | 502 | A |
| 12' | 554 | A |
| 13' | 511 | A |
| 14' | 535 | A |
| 15' | 499 | A |
| 16' | 504 | A |
| Comp. 1 | 12 | B |
| Comp. 2 | 8 | B |

It is apparent from the results shown in Table 19 that a considerable amount of barium was dissolved out from Samples No. 1' to 16' not containing a barium dissolving inhibitor, and Comparative Samples Nos. 1 and 2 containing an excess amount of a barium dissolving inhibitor exhibited poor drawability. In contrast, Samples Nos. 1 to 16, i.e., the drawing compositions of the present invention, effectively inhibited barium from dissolving out without impairing the drawability.

I claim:

1. A solid drawing composition containing barium sulfate, the composition comprising, as a barium dissolving inhibitor, at least one of (a) alkali metal sulfate, (b) beryllium sulfate, magnesium sulfate, calcium sulfate or strontium sulfate, (c) aluminum sulfate, (d) zinc sulfate, and (e) a double salt of said sulfates (a) to (d).

2. The solid drawing composition as defined in claim 1 wherein the barium dissolving inhibitor is at least one selected from the group consisting of sodium sulfate, potassium sulfate, calcium sulfate, magnesium sulfate, strontium sulfate, aluminum sulfate, zinc sulfate, calcium sodium sulfate, magnesium potassium sulfate, calcium potassium sulfate and zinc potassium sulfate.

3. The solid drawing composition as defined in claim 2 wherein the amount of the barium dissolving inhibitor is 0.001 to 20% by weight of the composition.

4. The solid drawing composition as defined in claim 3 wherein the amount of the barium dissolving inhibitor is 0.2 to 1% by weight of the composition.

5. A solid drawing composition comprising a wax, an extender pigment, a coloring pigment and barium sulfate, the composition further comprising as a barium dissolving inhibitor, at least one selected from the group consisting of (a) alkali metal sulfate, (b) beryllium sulfate, magnesium sulfate, calcium sulfate or strontium sulfate, (c) aluminum sulfate, (d) zinc sulfate and (e) a double salt of said sulfates (a) to (d).

6. The solid drawing composition as defined in claim 5 wherein the barium dissolving inhibitor is at least one selected from the group consisting of sodium sulfate, potassium sulfate, calcium sulfate, magnesium sulfate, strontium sulfate, aluminum sulfate, zinc sulfate, calcium sodium sulfate, magnesium potassium sulfate, calcium potassium sulfate and zinc potassium sulfate.

7. The solid drawing composition as defined in claim 6 wherein the amount of the barium dissolving inhibitor is 0.001 to 20% by weight of the composition.

8. The solid drawing composition as defined in claim 7 wherein the amount of the barium dissolving inhibitor is 0.2 to 1% by weight of the composition.

9. A solid drawing composition comprising a wax, an extender pigment, a coloring pigment, an olefin polymer and barium sulfate, the composition comprising, as a barium dissolving inhibitor, at least one of (a) alkali metal sulfate, (b) beryllium sulfate, magnesium sulfate, calcium sulfate or strontium sulfate, (c) aluminum sulfate, (d) zinc sulfate, and (e) a double salt of said sulfates (a) to (d).

10. The solid drawing composition as defined in claim 9 wherein the barium dissolving inhibitor is at least one selected from the group consisting of sodium sulfate, potassium sulfate, calcium sulfate, magnesium sulfate, strontium sulfate, aluminum sulfate, zinc sulfate, calcium sodium sulfate, magnesium potassium sulfate, calcium potassium sulfate and zinc potassium sulfate.

11. The solid drawing composition as defined in claim 10 wherein the amount of the barium dissolving inhibitor is 0.001 to 20% by weight of the composition.

12. The solid drawing composition as defined in claim 11 wherein the amount of the barium dissolving hibitiror is 0.2 to 1% by weight of the composition.

* * * * *